United States Patent [19]
Bendiksen

[11] Patent Number: 4,813,170
[45] Date of Patent: Mar. 21, 1989

[54] SWEEPLINE ROLLER-STOPPER
[76] Inventor: Reidar Bendiksen, 176 Rockland St., So. Dartmouth, Mass. 02748
[21] Appl. No.: 223,669
[22] Filed: Jul. 15, 1988

Related U.S. Application Data

[63] Continuation of Ser. No. 12,560, Feb. 9, 1987, abandoned.
[51] Int. Cl.⁴ .......................................... A01K 73/053
[52] U.S. Cl. ................................................ 43/9; 59/93
[58] Field of Search .......................... 43/9; 59/86, 93

[56] References Cited

U.S. PATENT DOCUMENTS

| 2,744,350 | 5/1956 | Bass | 43/9 |
| 2,910,796 | 11/1959 | Paulsen | 43/9 |
| 3,205,652 | 9/1965 | Luketa | 43/9 X |
| 3,220,137 | 11/1965 | Luketa | 43/9 |
| 3,959,909 | 6/1976 | Buschini et al. | 43/8 |
| 3,962,810 | 6/1976 | Buschini et al. | 43/8 |
| 3,962,811 | 6/1976 | Buschini et al. | 43/8 |
| 4,188,687 | 2/1980 | Millington | 43/8 X |

FOREIGN PATENT DOCUMENTS

| 85089 | 2/1955 | Norway . |
| 21009 | of 1904 | United Kingdom . |
| 22593 | of 1908 | United Kingdom . |
| 1465 | of 1909 | United Kingdom . |
| 13659 | of 1911 | United Kingdom . |
| 622604 | 5/1949 | United Kingdom . |
| 726292 | 3/1955 | United Kingdom . |
| 757008 | 9/1956 | United Kingdom . |
| 2157532 | 10/1985 | United Kingdom . |

OTHER PUBLICATIONS

*Commercial Fisheries News*, Jan. 1987, p. 43, "Trawl Spacer", advertisement of Westerbeke Fishing Gear Company.

Primary Examiner—Fred Silverberg
Assistant Examiner—Carmine Cuda
Attorney, Agent, or Firm—Lorusso & Loud

[57] ABSTRACT

A sweepline roller-stopper connects a sweepline to a bottom trawl while stopping lateral movement of rollers along the sweepline. In a preferred embodiment, the roller-stopper includes a tubular body member having a large washer welded to an end and a tang welded to a side. A bolt passing through the body member fixes the position of the roller-stopper on the sweepline chain. The roller (or a spacer) abuts the washer, which resists the lateral forces exerted by the roller. In another embodiment, a ring having a tang freely rotates about the body member, while the body member is fixed to the sweepline chain. The roller-stopper is rugged, resists wear, and prevents the trawl net from becoming tangled with the sweepline.

14 Claims, 8 Drawing Sheets

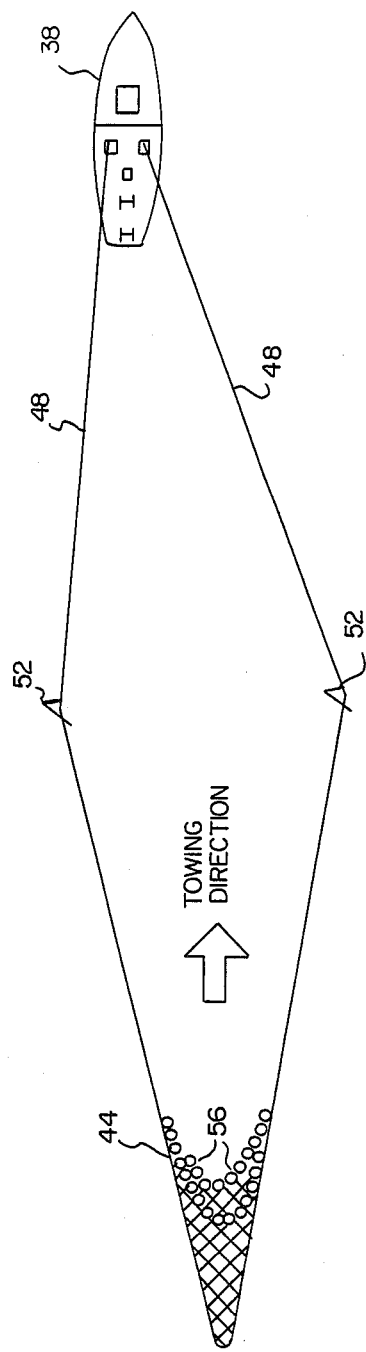

SWEEPLINE ROLLER-STOPPER

This is a continuation of co-pending application Ser. No. 012,560 filed on Feb. 9, 1987, now abandoned.

BACKGROUND OF THE INVENTION

The present invention relates to bottom trawl fishing, and more particularly to an apparatus for connecting the sweepline to the hanging chain of a bottom trawl while stopping lateral movement of the rollers along the sweepline to prevent tangling of the trawl net with the sweepline, and tearing of the trawl net.

In bottom trawl fishing, the trawl net is towed along the ocean bottom behind the trawler. The trawl net forms an envelope with a closed back and sides and an open front for catching the fish. Floats attached to the upper leading edge of the trawl net keep it a pre-determined distance above the bottom. The lower leading edge of the trawl is dragged, or preferably, rolls along the ocean floor. The typical sweepline includes large rubber rollers. The lower leading edge of the trawl net is connected by hanging chains to the sweepline, which in turn is attached to the trawler.

The sweepline net is attached to the trawler through a pair of main wires and a pair of ground cables. Trawl doors, also known as otter boards, are angled to the direction of travel so that seawater forces the trawl net open. One ground cable attaches each trawl board to a side of the trawl net. Thus, the leading edge of the trawl net takes a "U" shape.

The rollers which are located in the center portion of the "U", are subjected to small lateral forces along the sweepline. However, rollers on the legs of the "U", known as wing rollers, are subject to significant amounts of lateral force. To date, there has been no satisfactory method for connecting the sweepline to the hanging chain of the bottom trawl while resisting the substantial lateral forces exerted upon the rollers.

The best known connection in the prior art is the "shackle in" rig which utilizes a pair of free-spinning washers on either side of a conventional shackle which is connected to the sweepline chain. As pressure is exerted by the rollers laterally along the sweepline, the washers spin with the rollers. These washers tend to wear rather quickly, enlarging the center hole, and the washer slips over the shackle followed by the roller, resulting in tangling and tearing of the trawl net.

In order to slow the wearing process, the washers can be made from thick steel—up to ½ inch thick. These thick washers are called "rollers plates" and can cost up to $6.00 a piece.

Others have attempted to develop an improved method of connecting the sweepline to the hanging chain in the past. One such example in the prior art, is sold by the Westerbeke Fishing Gear Company and is called the Trawl Spacer. This apparatus consists of a "dumb-bell" shaped plastic spacer having a stainless steel band around the central, reduced section, and a shackle attached to the band for connecting to the hanging chain. It has been found, particularly when this apparatus is used on the wing of the sweepline, that the spacer turns with the rollers. The strong lateral forces exerted by the wing rollers on the spacer tend to twist and bind the stainless steel band, and the band clamps firmly to the spacer. The result is that a large portion of the sweepline will begin pulling hanging chains around it, and cause tangling with the trawl net. Sometimes the damage is so extensive that entire sections of net must be replaced.

Another method for connecting rollers to a trawl net is disclosed in U.S. Pat. No. 2,910,796 to Paulsen. In that patent, wooden rollers on the sweepline are provided with integral extensions and slip rings around the extensions. The slip rings are attached directly to a cable passing through the trawl net. In this manner, the rollers are supposed to remain connected to the trawl net when the sweepline cable breaks. One drawback to the '796 patent is that it requires the use of special rollers as opposed to the large rubber rollers currently used by many fishermen. Furthermore, particularly on the wind of the sweepline, friction from the rubbing of adjacent roller extensions, and wearing and twisting of the slip rings, tends to bind and inhibit rolling, causing tangling of the trawl net.

It is therefore a principal object of this invention to provide an apparatus for connecting a sweepline to the hanging chain of a bottom trawl while stopping lateral movement of rollers along the sweepline.

A further object is to provide a sweepline connection which prevents the loss of rollers in the event the sweepline chain breaks.

Another object is to provide a secure connection to the sweepline without interfering with free rotation of the rollers.

A still further object is to provide an apparatus which is useful on the wing as well as the center of the sweepline.

Yet a further object is to provide an apparatus which can be constructed relatively simply and economically, and can easily be attached to existing sweeplines using rubber rollers.

Other objects will in part be apparent and in part pointed out hereinafter.

SUMMARY OF THE INVENTION

The present invention is an apparatus for connecting a sweepline to the hanging chain of a bottom trawl while stopping lateral movement of rollers along the sweepline. In a preferred embodiment, the invention includes a tubular body member having at least one large washer attached to an end, and a tang attached to a side. As used within this specification, the term "tang" will be understood to mean a projection such as a shank, a tongue, or a loop. A bolt passes through the body and fixes the position of the body relative to the sweepline chain. A shackle through the tang connects the body to the hanging chain.

When installed on a sweepline, the roller-stopper of the present invention provides a rubbing surface which resists lateral pressures exerted by the rollers. The washer attached to the body member is prevented from bending due to the structural support provided by the body member. Since the washer does not rotate with the rollers, the wear upon the washer is uniform, and the roller is kept securely in place. In the event the sweepline chain breaks, only those rollers between roller-stoppers at the break will be lost. All others are kept in place on the remainder of the chain by the roller-stoppers.

BRIEF DESCRIPTION OF THE DRAWINGS

FIG. 2B is a top view of bottom trawl fishing;

DETAILED DESCRIPTION OF THE PREFERRED EMBODIMENTS

Figure 1:
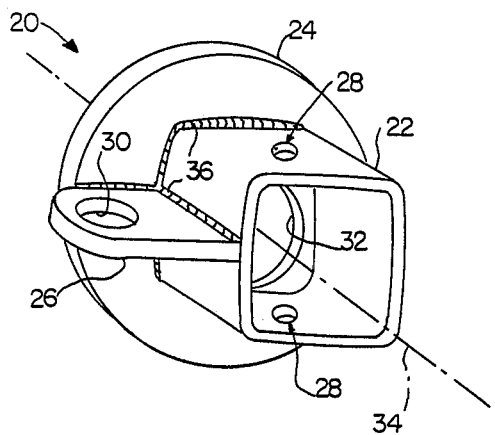
FIG. 1 is a perspective view of a preferred embodiment of a sweepline roller-stopper in accordance with the present invention.

Referring to FIG. 1, there is a sweepline roller-stopper 20 having a substantially rectangular body member 22, a washer 24 attached to an end and a tang 26 attached to a side. The body member 22 includes a pair of opposing holes 28 which permit passage of a bolt (not shown). The tang 26, shown here as a tongue with a rounded end, includes a hole 30 which permits attachment through a shackle (not shown) to a hanging chain (not shown). The roller-stopper may also be used without attachment to a hanging chain, in which case no tang is needed. The washer 24 has a central hole 32 which is aligned with the body 22 permitting a sweepline chain (not shown) to pass through the roller-stopper 20 along an axis 34. The washer 24 and tang 26 are attached to the body 22 with welds 36.

The operation and benefits of the roller-stopper 20 will be best understood after the following explanation of bottom trawl fishing.

Figure 2A:
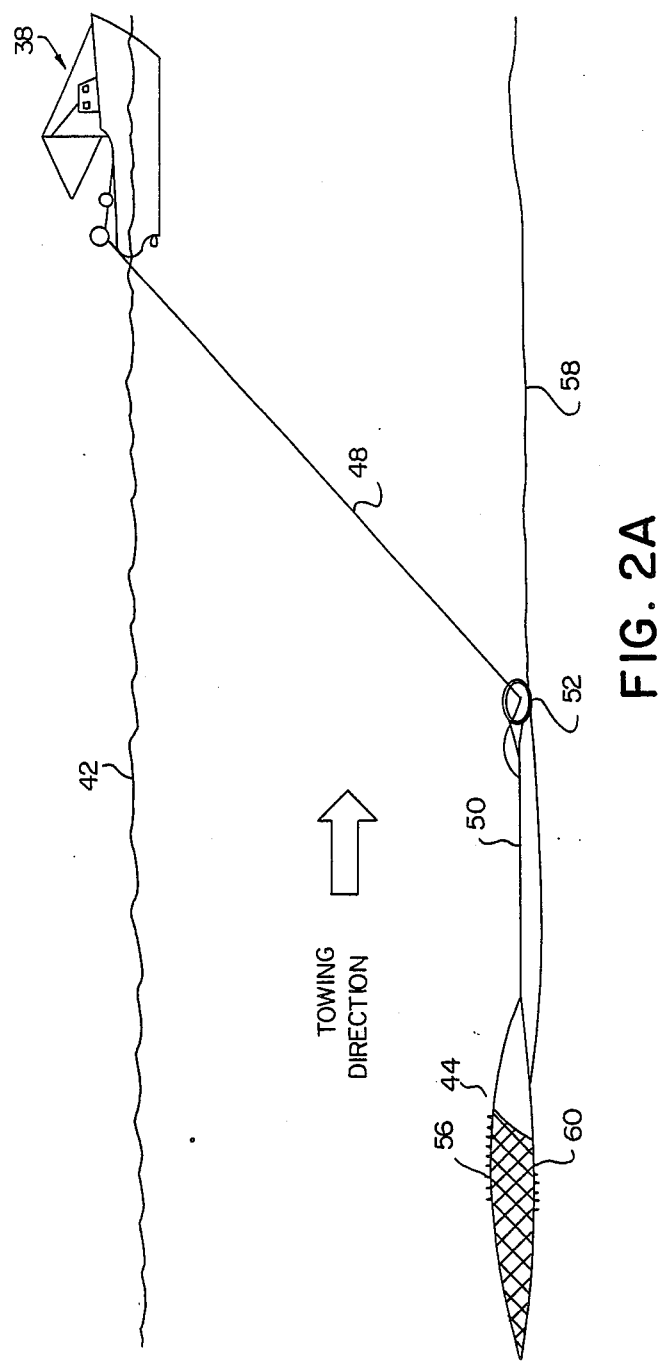
FIG. 2A is a side of bottom trawl fishing.

Referring to FIGS. 2A and 2B, there is shown a trawler 38. The trawler 38 is floating along an ocean surface 42. The trawler is towing a trawl net 44.

The trawl net 44 is connected to the trawler 38 through a pair of main wires 48 and a pair of ground cables 50. Both the main wires 48 and the ground cables 50 are connected to trawl doors 52. A trawl door is also commonly known as an otter board. As shown, the trawl door 52 is angled so that the seawater exerts a force perpendicular to the direction the trawler is traveling, and opens the trawl net.

Numerous floats 56 are attached to the upper leading edge of the trawl net 44, keeping the top of the trawl net a pre-determined distance above an ocean bottom 58. Numerous rollers 60 are attached to the lower leading edge of the trawl net 44, and roll along the ocean bottom 58.

Figure 3:
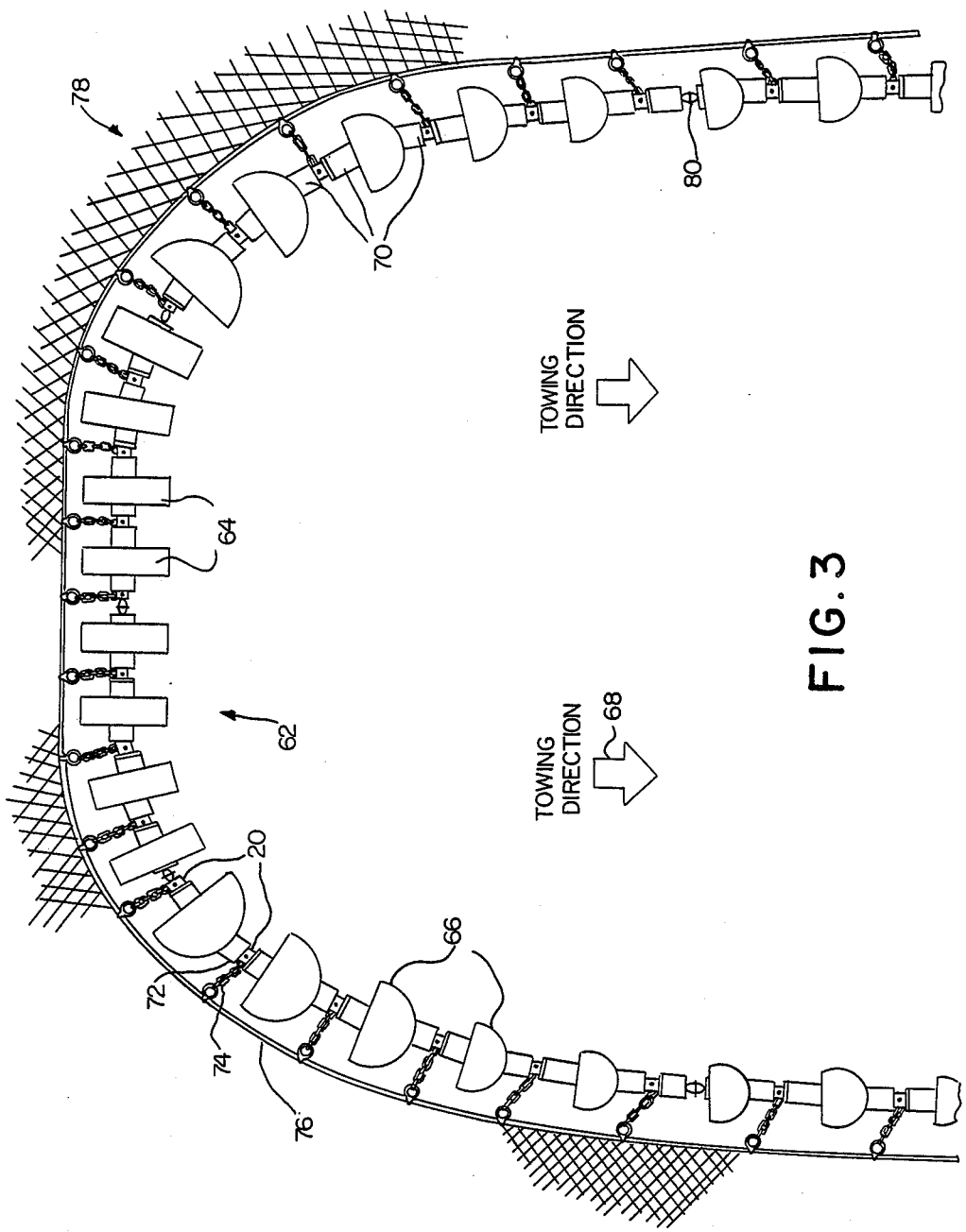
FIG. 3 is a top plan view of a sweepline using roller-stoppers in accordance with the present invention.

FIG. 3 presents a top view of a sweepline 62. As can be clearly seen, the sweepline 62 takes a "U" shape. In the center portion of the sweepline are several flat rollers 64, and along the side or wing of the sweepline are numerous wing rollers 66. The wing rollers 66 typically have a generally hemispherical shape, so that the rounded surface is oriented toward a towing direction 68.

Spacers 70 are located along the sweepline 62 adjacent to most of the flat rollers 64 and wing rollers 66. As is known in the art, the spacers 70 may be tubular rubber, as shown, or may be fabricated from numerous rubber disks cut out of worn truck tires. Sweepline roller-stoppers 20 in accordance with the present invention are located between rollers and generally adjacent to the spacers 70. The number of spacers used between rollers largely depends on the smoothness of the ocean bottom being fished upon.

Each roller-stopper 20 is connected through a shackle 72 to a hanging chain 74 which in turn is connected to a hanging line 76, usually made of rope. In several places, a chain connector 80 connects adjacent sections of sweepline chain. The sweepline 62 is divided into several sections in order to facilitate repair and replacement of worn rollers. The hanging line 76 is attached to the trawl net 78.

Figure 4:
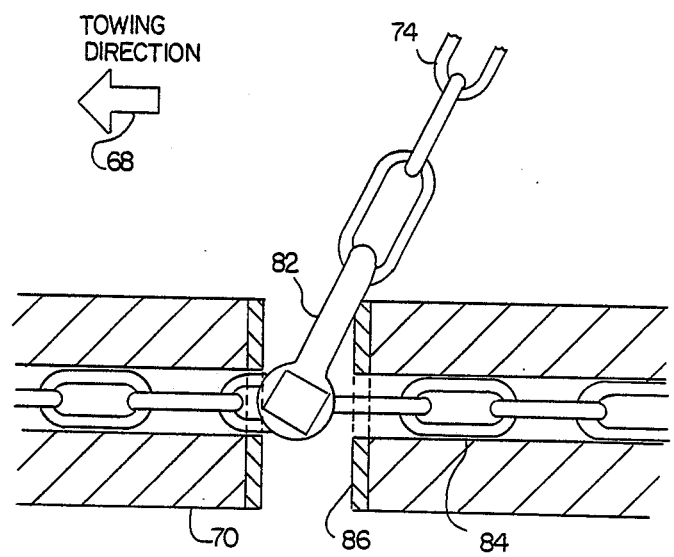
FIG. 4 is a view in partial vertical section of a "shackle-in" apparatus of the prior art.

Depending upon the location of the roller-stopper 20 on the sweepline 62, several different configuration of the roller-stopper will be most appropriate. In FIG. 3, the roller-stopper 20 has been shown used in place of the well-known "shackle-in" rig of the prior art. The shackle-in rig is shown in FIG. 4.

The typical prior art shackle-in rig includes a shackle 82 attached to the hanging chain 74 and bolted to a sweepline chain 84. A pair of washers 86 serve to separate the shackle 82 from the spacers 70. The washers 86 tend to rotate around the sweepline chain 84 with the spacers 70. As shown, the shackle 82 and hanging chain 74 are acutely angled from the sweepline chain 84 as the sweepline is being towed in the direction indicated by the arrow 68. This would typically be the case for a shackle-in rig located on the wing of the sweepline.

Figure 5:
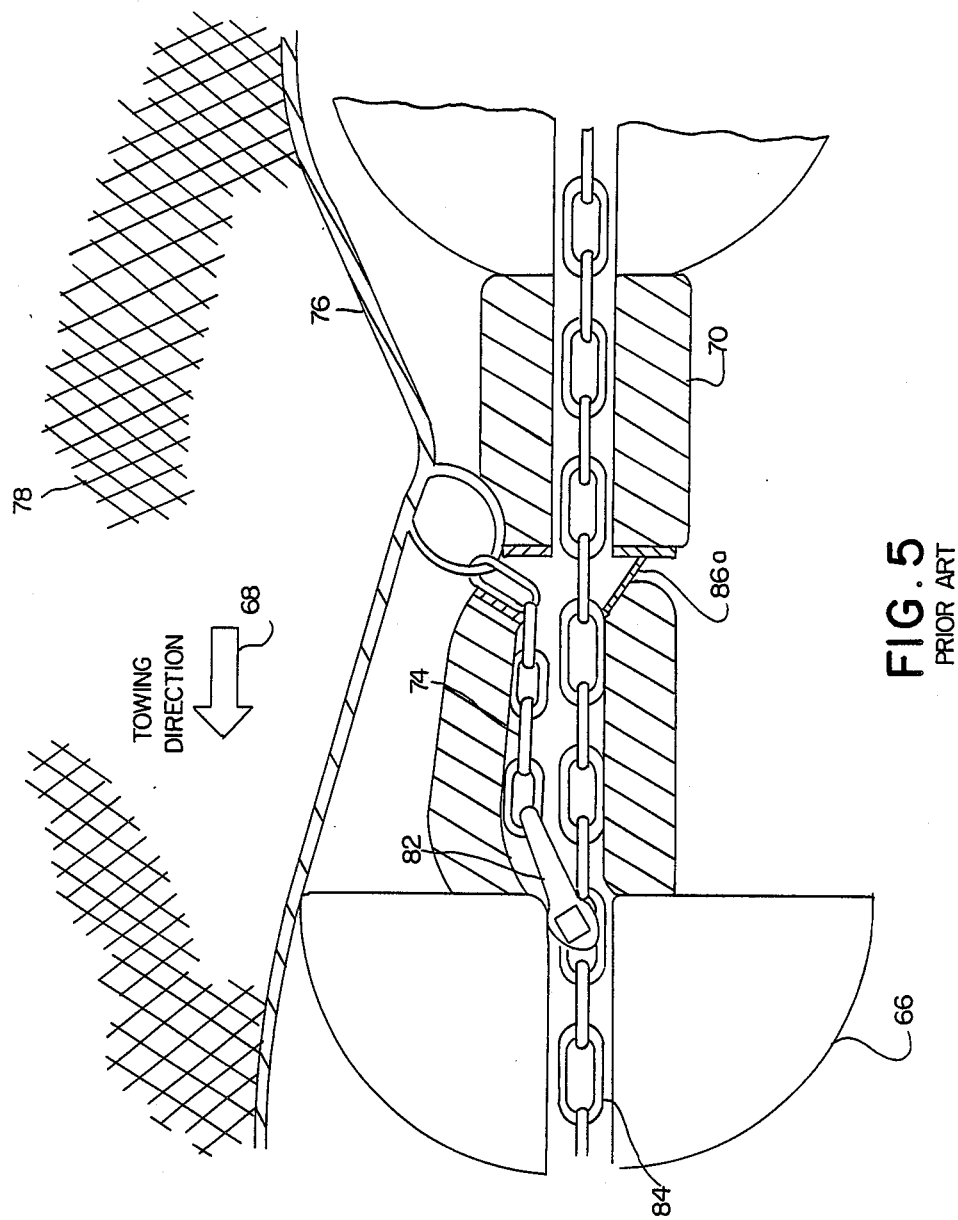
FIG. 5 is a view in partial vertical section depicting failure of the "shackle-in" apparatus of the prior art.

After fishing with the shackle-in rig for some time, the center hole of one of the washers wears so large that the shackle 82 is pulled through the center of the washer as shown in FIG. 5. As can be clearly seen, the washer 86a has worn and bent enough to permit the shackle 82 along with much of the hanging chain 74 to pass through. As a result, the hanging line 76 is pulled toward the sweepline resulting in tearing of the trawl net 78. Furthermore, once the shackle 82 goes into the wing roller 66, the wing roller is prevented from freely rotating. Once stuck, the wing roller drags along the bottom and wears flat on one side. The wing roller together with the spacers, shackle and hanging chain all get tangled with the hanging line 76. And the hanging line itself can become chafed by the roller and badly damaged.

Figure 6:
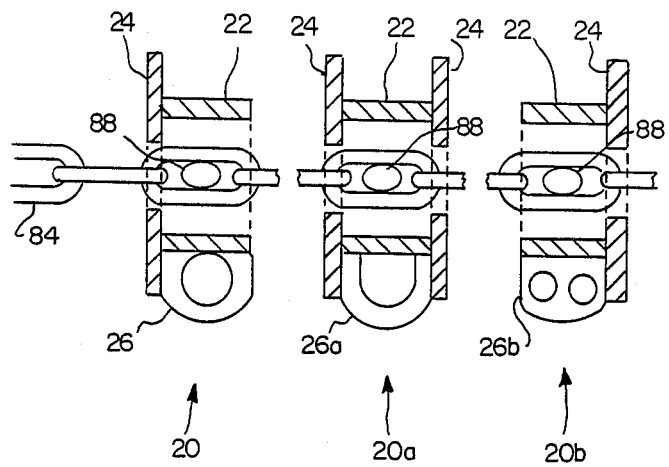
FIG. 6 is a view in partial vertical section of three embodiments of a sweepline roller-stopper in accordance with the present invention.

Referring now to FIG. 6, there are three embodiments of the roller-stopper 20, 20a and 20b all installed on the sweepline chain 84. The first embodiment, roller-stopper 20, includes the rectangluar body member 22, the single washer 24 and the tongue-shaped tang 26 having a hole. A bolt 88 passes through two opposing holes in the sides of the body member 22 and attaches the roller-stopper to the sweepline chain 84.

Roller-stopper 20a includes two washers 24 and would be useful in the center of the sweepline where force along the sweepline is exerted by rollers on both sides. Also, roller-stopper 20a includes a tang 26a in the shape of a half chain-link welded to a side of the body member 22.

Roller-stopper 20b includes a washer 24 on the opposite edge of the body member 22 from that shown on roller-stopper 20. Thus, roller-stopper 20b, as depicted would be used on the opposite wing of the sweepline from the one that roller-stopper 20 is used on. Roller-stopper 20b includes a tang 26b having two holes. The second hole could be used once the first hole began to exhibit some wear. Alternatively, two hanging chains could be simultaneously used at the highest stress points along the sweepline.

Figure 7:
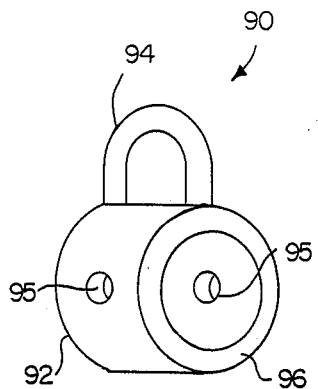
FIG. 7 is a perspective view of an alternate embodiment of a sweepline roller-stopper in accordance with the present invention.

Referring now to FIG. 7, there is an alternate embodiment of a roller-stopper 90. This roller-stopper includes a round body member 92 made of thick-walled pipe. A tang 94, in the form of a half chain-link, is welded to a side of the body member 92. There are a pair of holes 95 in opposing sides of the body member. In this configuration, the roller-stopper 90, when made of sufficiently thick-walled pipe, does not require a washer attached to an end. An edge-face 96 of the body member 92 is sufficiently broad enough to provide support to the spacers, and resist forces exerted by the rollers.

Figure 8:
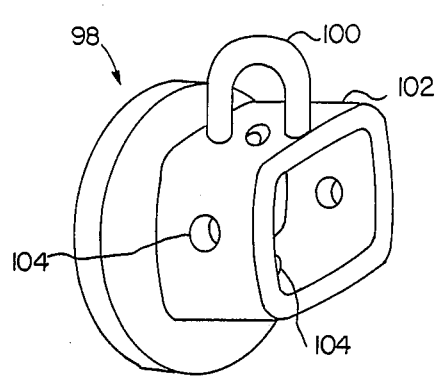
FIG. 8 is a perspective view of another alternate embodiment of a sweepline roller-stopper in accordance with the present invention.

In FIG. 8, there is another embodiment of a roller-stopper 98. In this embodiment, a tank 100, in the shape of a half chain-link, is welded to a side of a rectangular body member 102. Two pairs of opposing holes 104 are drilled in the sides of the body member 102. Thus, a bolt (not shown) may be provided in either of two directions to secure the roller-stopper 98 to the sweepline chain (not shown). Furthermore, one of each pair of holes 10 may be threaded as shown, so that use of a nut to secure the bolt is unnecessary.

Figure 9:
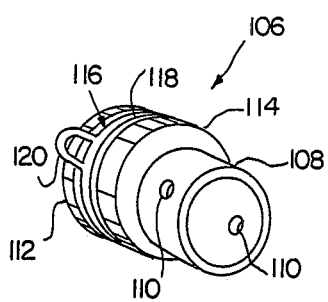
FIG. 9 is a perspective view of another preferred embodiment of a sweepline roller-stopper in accordance with the present invention.

Referring to FIG. 9, there is another embodiment of a roller-stopper 106. The roller-stopper 106 includes a round body member 108 having a pair of opposing holes 110 and a washer 112 welded to an end. A second washer 114, having a sufficiently large inside diameter, is welded to the outside of the body member 108 parallel to the washer 112. Thus, a peripheral trough 116 is formed between the washer 112 and 114. Within the trough 116 is a ring 118 having a tang 120. Of course, during assembly of the roller-stopper 106, the ring 118 is placed around the body member 108 before the washers 112 and 114 are both welded to the body member.

The roller-stopper 106 is advantageous in that the ring 118 may rotate about the body member 108 while the body member itself is fixed with respect to the sweepline chain (not shown). The ability to allow the ring 118 (and thus the hanging chain attached to the tang 120) to rotate about the body member 108 permits the roller-stopper to be used on a free-spining sweep, such as one that may already be utilizing the Westerbeke Trawl Spacer. In a free-spinning sweep, the sweepline itself rotates, while the rollers rotate at an even faster rate about the sweepline.

Although the roller-stopper 106 includes the ring 118 which may rotate freely about the body member 108, the present invention is in sharp contrast to the rollers and slip rings of the previously discussed '796 patent. In the present invention, the body member 108 remains fixed to the sweepline chain whereas in the '796 patent, the rollers with their extensions are intended to freely rotate about the sweepline. Furthermore, the washer 112 presents a wear surface against which the spacers and/or rollers abut. Thus, the ring 118 has nothing whatsoever to do with permitting the rollers to rotate about the sweepline whereas the slip rings of the 796 patent must freely rotate or else the rigging become tangled and torn.

Figure 10:
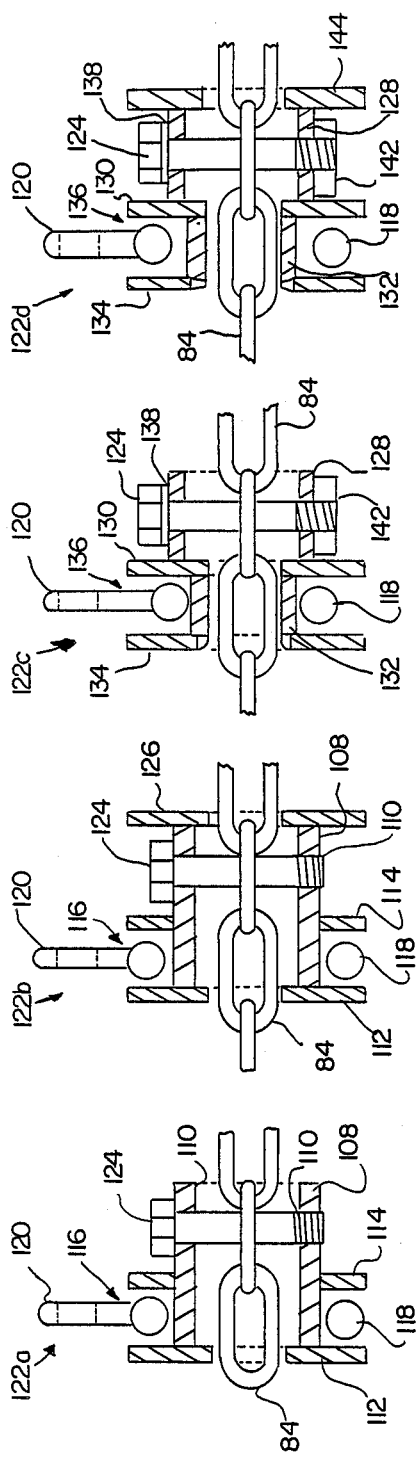
FIG. 10 is a view in partial vertical section of four embodiments of a sweepline roller-stopper in accordance with the present invention.

Referring now to FIG. 10, there are four embodiments of a roller-stopper 122a-d, each of which includes the ring 118. Thus, roller-stopper 122a, which is substantially identical to roller-stopper 106, has the washer 112 welded to one end and the washer 114 welded around the body 108. The washers 112 and 114, together with the outside surface of the body 108 between the washers, form the trough 116. The ring 118, having the tang 120, is loosely fitted within the trough 116 and freely rotates about the body 108. A bolt 124 passes through the opposing holes 110, connecting the body 108 to the sweepline chain 84. As shown, one of the holes 110 is threaded to engage the bolt 124. The roller-stopper 122b is substantially identical to the roller-stopper 122a, except for the addition of a washer 126 attached to the opposite end of the body 108 from the washer 112. Thus, the roller-stopper 122b, resists force exerted by the spacers and rollers (not shown) from either direction along the sweepline chain 84.

The roller-stopper 122c has a rectangular body member 128. A washer 130 is welded to an end of the body member 128. A round pipe 132, having an inside diameter approximately the same as that of the washer 130, is welded to the washer 130. Another washer 134 is welded to the pipe 132. The space between the washers 130 and 134 and along the outside of the pipe 132 form a trough 136 within which the ring 118 having the tang 120 freely rotates. The bolt 124 passes through a lock washer 138, a first hole 140, then through the sweepline chain 84, and a second hole 140 where it engages a nut 142. The roller-stopper 122d is substantially identical to the roller-stopper 122c except for the addition of a washer 144 attached to the side of the body member 128 opposite from the washer 130. Thus, the roller-stopper 122d resists forces from either direction along the sweepline.

Figure 11:
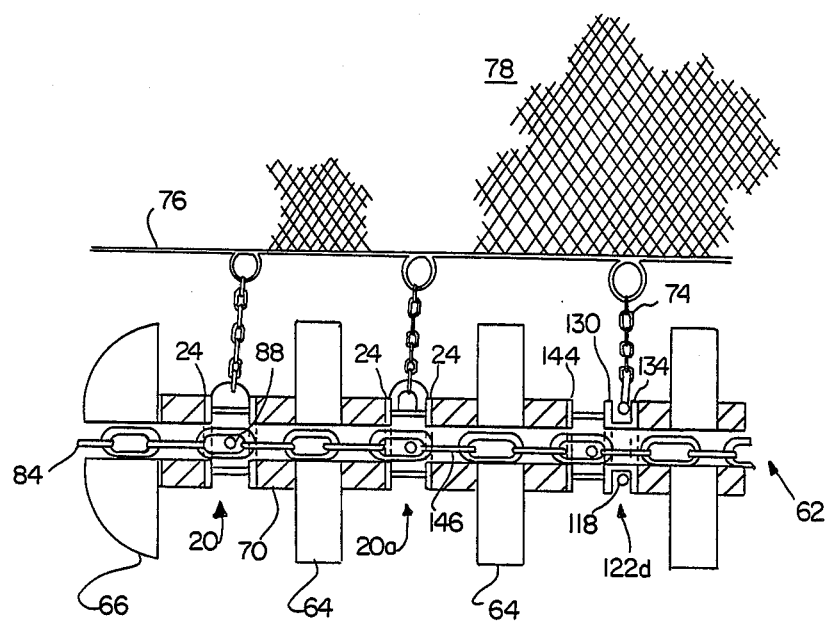
FIG. 11 is a view in partial vertical section of three roller-stoppers in accordance with the present invention connecting a sweepline to the hanging chain of a trawl net.

Referring now to FIG. 11, there are three of the previously discussed embodiments of the roller-stopper 20, 20a, and 122d installed on the sweepline 62 and connecting the hanging chains 74 to the hanging line 76 and the trawl net 78. The roller-stopper 20 is installed between wing roller 66 and one of the flat rollers 64. As discussed previously, the roller-stopper 20 includes the washer 24 attached to one side. The roller-stopper 20a, here located between a pair of flat rollers 64, includes the two washers 24, one located on each end. The roller-stopper 122d includes the ring 118 within the trough formed by the washers 130 and 134, and thus permits the hanging chain 74 to rotate about the body of the roller-stopper.

In addition to resisting lateral forces exerted by the rollers 64 and 66, and thus preventing tangling and tearing of the trawl net 78, the roller-stoppers of the present invention also serve to prevent the loss of rollers in the event the sweepline chain 84 breaks. Consider, for example, that a link 146 were to break. A single flat roller 64, near the link 146 would be lost. However, roller-stoppers 20a and 122d, connected to the sweepline chain 84 on either side of the broken link 146, would prevent the loss of any further rollers.

Roller-stoppers in accordance with the present invention have been experimentally used on the trawler Gen. Geo. S. Patton out of New Bedford, Massachusetts for approximately nine months with excellent results. The fishing was largely done on hard bottom about 30–50 miles E.-S.E. from Nantucket Island in an area known as "B.B. Bouy". During this period of time, only slight wear to the bolts and tangs was observed, and none of the roller-stoppers have worn to the point where the trawl net has been tangled or torn. Several different versions of the roller-stopper were tested. All versions were found to perform satisfactorily. However, two minor problems with some embodiments were discovered.

Figure 12:
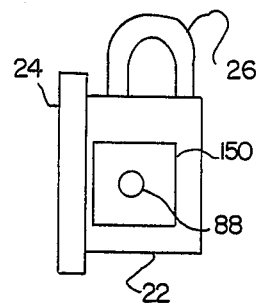
FIG. 12 is a plan view of a preferred method of attaching a sweepline roller-stopper in accordace with the present invention to a sweepline chain.

First of all, it was found that after prolonged use in seawater, the threads of the bolt would become frozen, and the bolt would become very difficult to remove. This was particulary troublesome when the roller-stopper had either a nut welded to the side of the body, or had the body threaded to engage the bolt. The best solution has proven to be used of a separate bolt and nut, so that the bolt may be cut from the roller-stopper if the nut cannot be removed. Then, the roller-stopper can be reused, and all that need be replaced is the bolt and nut. As shown in FIG. 12, it has also been found advantageous to use a large square-shaped nut 150 which comes close to abutting the washer 24 welded to the end of the body 22, and thus is kept from turning.

The second problem area arose at the tang. A conventional shackle, which may be similar to the type used in shackle-in ringing as discussed above, is used to attach the tang of the roller-stopper to the hanging chain. If the loop of the shackle is inserted into the tang, then the bottom of the shackle could catch on the trawl net. Therefore, it is recommended that the hole in the tang be large enough to fit the bottom of the shackle, and the loop of the shackle be oriented toward the trawl net, or that a shackle with a smooth end be used.

Although the roller-stopper of the present invention wears much better than the shackle-in rig previously described, the washers attached to the outside of the body member do exhibit some wear with prolonged used. This is very easy to remedy, as the washers are structurally supported by the body member they do not bend, and therefore, a new washer may easily be welded onto the old worn washer.

It is thus seen that the objects of this invention have been achieved and other advantageous results attained in that there has been disclosed an apparatus for connecting a sweepline to the hanging chain of a bottom trawl while stopping lateral movement of rollers, which prevents loss of rollers in the event the sweepline chain breaks, which provides a secure connection to the sweepline without interfering with free rotation of the rollers, which is simple and economical to construct, and can easily be attached to existing sweeplines which use rubber rollers.

While the foregoing FIGS. 1–11 show various embodiments having welded parts, it is to be understood that such structure and material is not intended as any limitation, as the present invention might be cast in a single piece, molded from other materials such as plastics, fabricated from galvanized steel, or include elements having other shapes, for example square washers.

Various modifications of the present invention will become apparent to those skilled in the art from the foregoing description and accompanying drawings. For example, while the operation of the invention has been described in conjunction with bolting the roller-stopper to a sweepline chain, it would also be possible to clamp the roller-stopper to a sweepline cable. Such modifications are intended to fall within the scope of the appended claims.

What is claimed is:

1. A sweepline roller-stopper for connecting a sweepline, including a sweepline chain and rollers, to the hanging chain of a bottom trawl, comprising:
    a tubular body member of substantially rectangular or circular shape and of one-piece construction including a unitary tang means, providing an end-to-end passage large enough to accommodate the sweepline chain;
    means for preventing rotation of the body member about the sweepline chain;
    means for preventing lateral movement of a roller along the sweepline at least at one said end; and
    said tang means being a portion of said body member to connect said body member to the hanging chain.

2. The apparatus of claim 1 wherein said lateral movement preventing means includes at least one washer attached to said body.

3. The apparatus of claim 1 wherein said lateral movement preventing means includes an edge-face of said body.

4. The apparatus of claim 1 wherein said rotation preventing means includes a bolt passing through said body.

5. The apparatus of claim 1 wherein said lateral movement preventing said mains includes a washer attached to each said end.

6. A sweepline roller-stopper for connecting a sweepline, including a sweepline chain and rollers to the hanging chain of a bottom trawl, comprising:
    a tubular body member of one-piece construction including a laterally extending tang portion and providing an end-to-end passage large enough to accommodate the sweepline chain,
    at least one washer attached to an end of said body member, and
    a said tang portion having at least one hole for connecting to said hanging chain.

7. The apparatus of claim 6 wherein said body member has a substantially rectangular shape.

8. The apparatus of claim 6 wherein said body member has a substantially circular shape.

9. The apparatus of claim 6 further comprising a washer attached to both ends of said body member.

10. The apparatus of claim 6 wherein said body member has a hole in each of two opposing sides, and further comprising a bolt passing through said holes.

11. The apparatus of claim 10 wherein one of said hole is threaded to engage threads on said bolt.

12. The apparatus of claim 10 further comprising a threaded nut to engage threads on said bolt.

13. The apparatus of claim 12 wherein said nut is sized and configured so that one edge of said nut comes into close proximity with said washer, whereby contact between said nut and said washer prevents said nut from turning.

14. A sweepline roller-stopper for connecting a sweepline, including a sweepline chain and rollers, to the hanging chain of a bottom trawl, comprising:
    a tubular body member of substantially rectangular or circular shape and of one piece construction, providing an end-to-end passage large enough to accommodate the sweepline chain, and having a hole in each of two opposing sides, and further comprising a bolt passing through said holes to prevent rotation of said body member about the sweepline chain, and a nut to engage said bolt;

at least one washer or edge face attached to an end of said body member;

a tang having at least one hole, said tang being unitarily attached as a part of said body member extending to a side of said body member for connecting the body member to the hanging chain;

wherein said nut is sized and configured so that one edge of said nut comes into close proximity with said washer or edge face, whereby contact between said nut and said washer or edge face prevents said nut from turnings.

* * * * *